United States Patent [19]

Maslowski et al.

[11] 3,823,276

[45] July 9, 1974

[54] RECORDING/REPRODUCING RADIATION SYSTEM WITH THE RECORD MEDIUM WRAPPED AND GUIDED HELICALLY INSIDE A HOLLOW CYLINDER

[75] Inventors: Stefan Maslowski, Aufheim; Manfred Börner, Ulm/Danube; Hans-Peter Huber, Thalfingen; Werner Löffler, Ulm/Danube, all of Germany

[73] Assignee: Licentia Patent-Verwaltungs-G.m.b.H., Frankfurt am Main, Germany

[22] Filed: July 30, 1970

[21] Appl. No.: 59,471

[30] Foreign Application Priority Data

July 31, 1969 Germany .......................... 1938790

[52] U.S. Cl. ..... 179/100.3 B, 178/6.7 A, 178/6.7 R, 346/108

[51] Int. Cl. .......................... G11b 7/00, H04n 5/84

[58] Field of Search .......... 179/100.3 B; 178/6.7 R, 178/6.7 A, 7.4; 346/108; 340/173 LM; 250/219 D, 219 DD, 219 FT, 219 QA, 219 Q, 219 FR

[56] References Cited

UNITED STATES PATENTS

| | | | |
|---|---|---|---|
| 1,746,407 | 2/1930 | Schrorev et al. | 178/6.7 R |
| 1,792,264 | 2/1931 | Alexanderson | 346/108 |
| 2,044,831 | 6/1936 | Chereau et al. | 178/6.7 R |
| 2,195,701 | 4/1940 | Kent | 179/100.3 B |
| 2,510,121 | 6/1950 | Lehmann et al. | 178/6.7 A |
| 2,997,539 | 8/1961 | Blackstone | 340/173 LM |
| 3,293,657 | 12/1966 | Silverman | 346/108 |
| 3,314,075 | 4/1967 | Becker et al. | 178/6.7 R |
| 3,600,507 | 8/1971 | Newgood | 178/6.7 A |

OTHER PUBLICATIONS

IBM Disclosure Bulletin, Perforated Tape Reader, Vol. 4, No. 3, Aug. 61, page 20.

*Primary Examiner*—Raymond F. Cardillo, Jr.
*Attorney, Agent, or Firm*—Spencer and Kaye

[57] ABSTRACT

A high density optical data recording and reproducing system for use with light-sensitive tape-type recording carriers including a cylinder, a structure for guiding a tape carrying a light-sensitive substance along the inner surface of the cylinder and a mirror for continuously deflecting a recording or reproducing light beam around the periphery of the cylinder while the tape advances along the cylinder axis so that the beam describes a path across each tape oblique to its axis. In the case of recording, the beam is modulated by the information to be recorded and discolors the carrier. In the case of reproduction, the beam traverses the tape and the image on the illuminated portion is enlarged and focussed on a reproduction device.

16 Claims, 8 Drawing Figures

INVENTORS.

Stefan Maslowski
Manfred Börner
Hans-Peter Huber
Werner Löffler

BY Spencer & Kaye
ATTORNEYS.

Inventors.
Stefan Maslowski, Manfred Börner,
Hans-Peter Huber, Werner Löffler
BY Spencer & Kaye
ATTORNEYS.

RECORDING/REPRODUCING RADIATION SYSTEM WITH THE RECORD MEDIUM WRAPPED AND GUIDED HELICALLY INSIDE A HOLLOW CYLINDER

BACKGROUND OF THE INVENTION

The present invention relates to a data storage system in which the storage medium is a recording substance which is applied to a tape-type carrier and whose radiation permeability is changed by applying a writing beam constituted by a high-energy laser beam, the data being read out by means of readout beams.

As electronic data processing systems increase in size, they require correspondingly larger memories. Conventional large-size memories, such as magnetic disc memories or magnetic tape memories, require relatively a large amount of space.

The space requirement for such memories, which carry recordings in the form of local alignments of small magnetizable particles in a recording layer established under the influence of an external magnetic field, can not be reduced below a certain limit because of the minimum permitted width of the recording tracks.

It has already been proposed to effect a reduction in the necessary space by taking advantage, for data recording purposes, of the property of certain recording substances of becoming discolored under the influence of high-energy radiation. The recording substances are usually organic in nature and react to ultra-violet light radiation, for example, by undergoing a locally limited discoloration. It is also known to locally perforate a metal foil by light or particle radiation and to thus record data.

The above-mentioned methods permit the use of relatively small local regions as elementary memory locations since it has been possible, for example with the aid of laser beams, to produce on an organic recording substance a series of elementary memory regions forming recording tracks having a width of the order of a few $\mu$ (microns). This of course permits the arrangement of adjacent recording tracks in close proximity, e.g. at a spacing of 10 $\mu$ when the width of each recording track is 3 $\mu$. However, such a recording density makes it very difficult to locate individual data among a multitude of total recorded data.

Methods are also known of recording very high frequencies with relatively slow advancement speeds of the magnetic tape, which is known from the magnetic tape art. The need for this arises, for example, in the recording of television signals. In the practice of this method, the recording tracks are not oriented parallel to the longitudinal axis of the magnetic tape but rather at an angle thereto. The obliqueness of the tracks is produced either by bringing rotating recording heads, whose respective planes of rotation are perpendicular to the tape surface and to the direction of tape advance, past a magnetic tape which moves parallel to its longitudinal axis. This is often referred to as the Ampex method. According to another method, the tape is brought around a cylinder along a helical path, the recording heads again rotating in the interior of this cylinder.

The main difficulty of these known methods is that the tapes and the magnetic heads must be guided with extreme accuracy in order to prevent recording errors while maintaining the required small distances between the magnetic heads and the tapes.

Considerable technical efforts are required to overcome these difficulties.

Figures 1, 2:
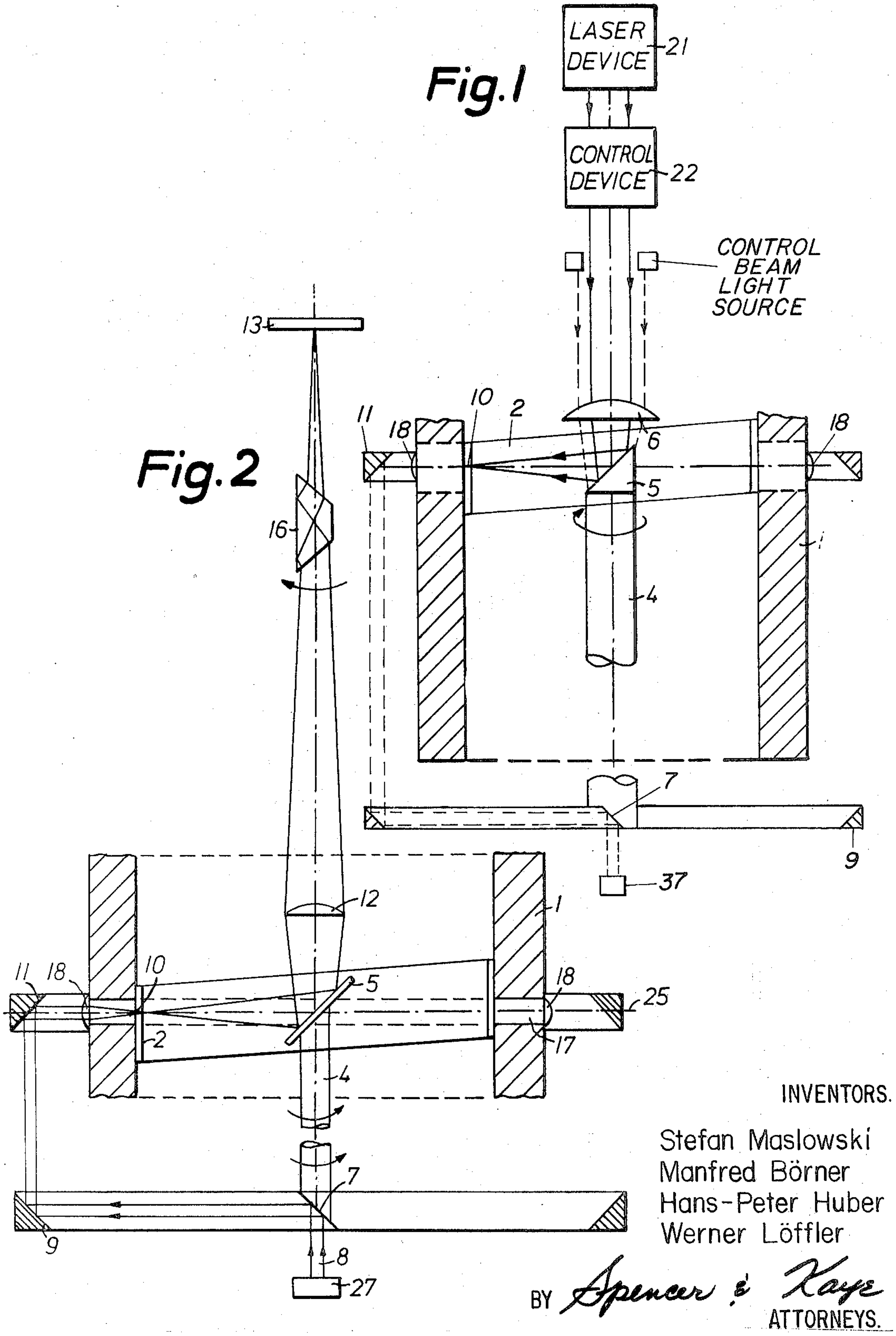
FIG. 1 is a side view, partly in cross-section, of a first embodiment of the invention for writing-in information.
FIG. 2 is a view similar to that of FIG. 1 of a corresponding readout arrangement.

FIG. **4*a* is a detail view showing the light path through an element of the device of FIG. 2.**

Figures 4A, 4B:
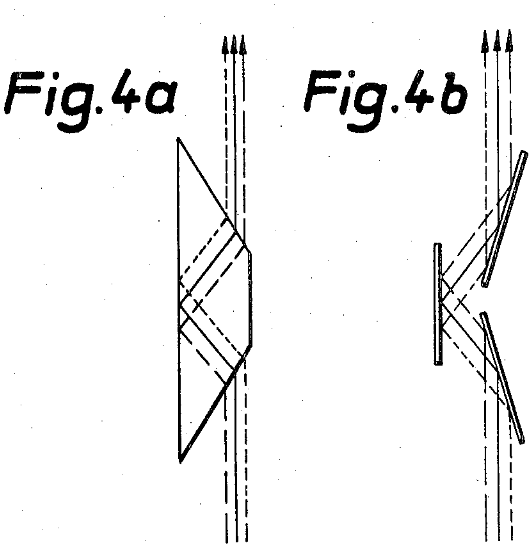

FIG. **4*b* is a detail view of an element which can replace the element of FIG. 4*a*.**

Figure 5:
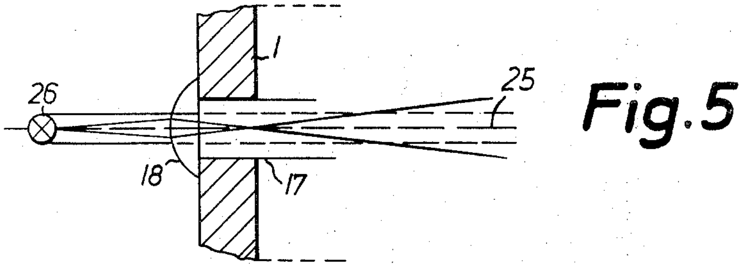

FIG. 5 is a detail view of a modified form of construction of a portion of the embodiment of FIG. 2.

FIG. **6*a*** is a view in axial direction of the hollow cylinder showing the guidance of the tape.

Figure 6A:
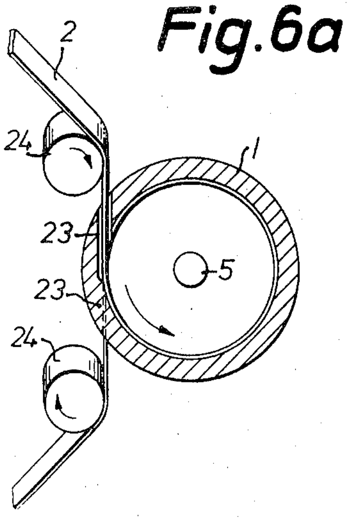

FIG. **6*b* is a side view, partly in cross-section, corresponding to FIG. 6*a*.**

DESCRIPTION OF THE PREFERRED EMBODIMENTS

To simplify the description of the invention, only the writing process will be initially discussed in detail below.

FIG. 1 shows a write-in device according to the invention composed of a hollow cylinder 1 along whose inner wall is disposed a tape-type information carrier 2. Close contact between the tape-type carrier and the cylindrical curvature can be achieved in a known manner, e.g. by suction slits in the cylinder walls.

A rotating shaft 4 is disposed along the center axis of the hollow cylinder 1 and bears a mirror carrier 5 at its upper end. In the illustrated case, the mirror carrier 5 is provided with only one mirror disposed so that it reflects light beams emitted by a laser device 21 and travelling parallel to the center axis of the hollow cylinder onto the jacket surface of the hollow cylinder. The output of device 21 is modulated by a control device 22 according to the information to be recorded. In order to give the recording track sufficient optical definition, a lens system 6 is provided to effect the required focusing on the carrier. To achieve high recording quality it is desirable that the light beams impinge on the hollow cylinder at a right angle.

Due to the rotary movement of the mirror carrier 5 on shaft 4, the impinging light beam is guided along a peripheral line of the hollow cylinder. If now the tape-type carrier 2 hereinafter referred to as "tape", is advanced uniformly in the direction illustrated in FIGS. **6*a* and 6*b*,** the light beam describes parallel segments of helical lines thereon. The tape is wound on reels in the conventional manner after leaving the hollow cylinder.

It is always impossible to utilize the entire width of the tape for recording data; the edge zones must be left free since dependable recordings are not possible thereon due to unavoidable inaccuracies in the tape guidance. Space must also be left for recording the address information which permits the location of the individual pieces of data.

Figure 6B:
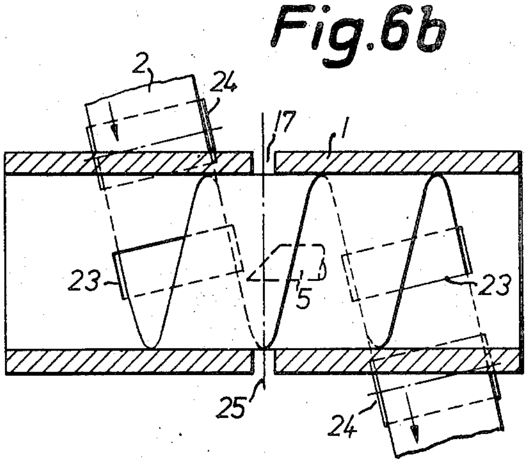

Generally it will be desired to record a uniform flow of information on a single recording carrier. In such a case it is advantageous to provide an arrangement in which the tape is brought along the hollow cylinder in a helical line in one or more turns, e.g. as shown in FIGS. 1 and 6a and 6b. The number of turns may be an integer. The tape 2 is fed into and out of the hollow cylinder 1 through slits 23. At the entrance and exit slit it is guided by reels 24 whose axis form an appropriate angle with the axis of the hollow cylinder. The plane 25 is the plane where the light beam hits the tape and writes recording tracks which form an oblique angle with the longitudinal axis of the tape. In this case also it is necessary to leave some unused space along the edge of the tape to compensate for inaccuracies in the tape guidance and to accommodate address information. The tape guidance can again be accomplished, for example, by suction slits in the cylinder wall.

The above-described writing process is supplemented by a readout process employing a light beam travelling in the opposite direction.

Readout occurs in the conventional manner again by light beams which will be called readout beams for the sake of differentiation. These readout beams are conducted to evaluation devices in dependence on the tape discoloration or perforation state representative of the recorded information.

In the case of the above-described organic recording substances which employ a discoloration reaction, it is necessary, for nondestructive readout, to select a wavelength for the readout beams which does not produce a further discoloration reaction.

In an advantageous manner the readout beams are generated outside of the hollow cylinder and are directed thereon in such a manner that they penetrate it at the readout points while passing from the outside toward the inside. To make this possible, the hollow cylinder must consist of a material which is permeable to the readout radiation, e.g. provided with appropriate openings in the plane of the readout points. After passing through the hollow cylinder, the readout beams are modulated by the degree of discoloration of the recording substance. It is necessary to align the readout beams in such a manner that they subsequently impinge on the mirror and are reflected from there in such a manner that they leave the hollow cylinder substantially parallel to and along its center axis and are fed into an evaluation device which is disposed, for example, in the vicinity of the end face of the hollow cylinder.

An advantageous further modification of the data storage system according to the present invention provides for the construction of the walls of the hollow cylinder in the vicinity of the readout points as an annular cylindrical lens, as shown in FIG. 5, which is a cross-sectional view through the wall of the hollow cylinder. The hollow cylinder 1 is there provided with an annular slit 17 in the plane of the readout points 25 which is closed off at the outside by a cylindrical lens 18 which completely surrounds the hollow cylinder. This cylindrical lens permits a simple focusing of the readout beams on the recording substance.

The light source for the readout beams is disposed either in a ring 26 around the hollow cylinder in the plane of the readout points or a light source is employed whose beam is caused to travel around the hollow cylinder by means of a suitable additional mirror arrangement coupled with the rotating shaft so that the beam always impinges on the mirror at the desired point and at the correct angle of incidence.

FIG. 2 illustrates this added possibility in an arrangement in which a mirror 7 is disposed on the rotating shaft to reflect the readout beam 8 of source 27 in such a manner that it impinges on an annular mirror 9. This mirror 9 directs the readout beam 8 to a further annular mirror 11 which reflects the readout beam toward the hollow cylinder from the outside to form a readout beam 10 which impinges at the desired readout point in plane 25. The readout beam passes into the interior of the hollow cylinder, is modulated by the tape at the readout point and is then directed by the mirror on carrier 5 through an optical system 12 and to the evaluation device 13.

The evaluation device is constructed substantially of photodiodes which convert the impinging light pulses to electrical pulses.

Due to the narrow width of each recording track, the readout beam should also have an extremely small diameter to assure sufficient resolution. It would therefore be necessary to position the readout beam very accurately with respect to the recording track and this presents considerable difficulties due to the above-mentioned unavoidable inaccuracies in the tape guidance.

Figure 3:
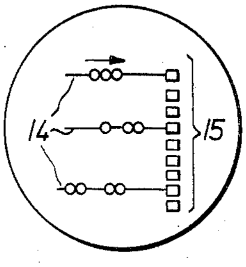
FIG. 3 is a pictorial view of a reproduction of part of the recorded material appearing in the device of FIG. 2.

In an advantageous further development of the present invention it is therefore desired to simplify the readout process in order to increase the access accuracy. This can be accomplished by giving the readout beam 10 a width which is a multiple of the sum of the width of each recording track and the distance between adjacent recording tracks. Through the optical system 12 an enlarged reproduction of the recorded material will result at the evaluation device for the readout point under consideration, as is shown in FIG. 3. In FIG. 3 a reproduction is shown for a tape on which the recording tracks 14 have a width of, e.g. 3 $\mu$ and a mutual spacing of e.g. 10 $\mu$. On each recording track the recorded bits are disposed directly next to one another.

In the reproduction at the evaluation device these dimensions will be enlarged e.g. by a factor 10.

In order to locate the recording track of interest at the moment, a row of photodiodes is provided. The distance between photodiodes is less than the distance between the adjacent tracks in the enlarged reproduction at the evaluation device. The rotating movement of the mirror carrier 5 effects a corresponding rotation of the reproduction shown in FIG. 3 and a simultaneous movement of the tracks 14 toward the photodiodes 15. The rotation of the reproduction would have the effect of continuously varying the orientation of the track images relative to the photodiodes if device 13 were not rotated with shaft 4. A suppression of this interfering rotation is made possible in a simple manner by the introduction of a Dove prism 16 into the beam path, this Dove prism being caused to rotate in a direction opposite that of the mirror carrier and at half its rate of rotation. This principle is known from the periscope for panoramic sight and is described, for instance, by L. Levi in Applied Optics, Vol. 1, p. 363 – 365, Wiley — New York/London/Sydney, 1968. Instead of the Dove prism which produces the beam path shown in FIG. 4a, it is also possible to use an analogously constructed mirror arrangement as shown in FIG. 4b. In the case of either embodiment, the tracks 14 are caused to move linearly past the photodiodes 15 when the mirror carrier 5 rotates.

The individual photoelements of the raster emit a photocurrent depending on the information contained in the tracks which they sense. This occurs in such a manner that those photoelements which are completely affected by the recording tracks emit an extreme value of the signal which decreases when the recording track drifts laterally due to mechanical displacements, in which case two adjacent photoelements might each be partially affected by a track. The resulting outputs offer the possibility of choosing the photoelement with the highest signal-output.

On the other hand, it is relatively easy, based on the address data which were recorded along with the information, to isolate the recording track of interest from the recording tracks illustrated in FIG. 3.

Another advantageous further development of the present invention provides for the hollow cylinder to be provided with a synthetic coating over its entire inner surface or at least at those places where the tape-type carriers come in contact therewith. This coating is of a material which permits the creation of a low degree of surface roughness and contributes to the prevention of scratches on the recording substance. By a suitable selection of the synthetic employed it is also possible to electrostatically charge this coating and the tape-type carrier in such a manner that a close adhesion of the tape-type carrier to the inner surfaces of the hollow cylinder is enhanced. E.g. Perfluorpolyethylene (teflon) is suitable for this purpose.

In a further advantageous embodiment of the present invention, a control reading is performed during recording. For this purpose as shown in FIG. 1, an unmodulated control beam is emitted along the same path as and together with the writing light beam producing the discoloration. This control beam passes through the hollow cylinder from the inside toward the outside after having been modulated by the discoloration and is then directed by a suitable mirror arrangement, for example by the mirror arrangement 9 and 11 provided for the readout process, to a control receiver 37 which permits a comparison of the actually effected discoloration with the data to be recorded. The use of the cylindrical lens 18 here of FIG. 5 in such an arrangement has the additional advantage that the control beam exhibits only a narrow beam width after it leaves the hollow cylinder. For this purpose the control receiver 37 is located in place of the light source 27 of the normal reading process.

It will be understood that the above description of the present invention is susceptible to various modifications, changes and adaptations, and the same are intended to be comprehended within the meaning and range of equivalents of the appended claims.

We claim:

1. A system for processing data stored in the form of radiation permeability variations on a tape of a material whose permeability is modified by an impinging beam of a particular type, comprising in combination:

a hollow cylinder having an inner wall arranged for receiving one such tape for movement along a predetermined helical path against said inner wall;

means associated with said cylinder for guiding such tape along such helical path, with the portion of the tape within the cylinder being supported exclusively via the surface of the tape which faces said inner wall;

mirror means disposed along the axis of such cylinder and oriented for reflecting light travelling along said axis 90° to be normal to the axis of said cylinder;

mirror carrier means supporting said mirror for rotation about the cylinder aixs; and light producing means positioned relative to said cylinder for producing a light beam which follows a path having two linear portions one of which extends normal to the tape surface and through the tape guide path and the other of which extends along the cylinder axis, the two portions meeting at said mirror means where the beam is reflected.

2. An arrangement as defined in claim 1 wherein said carrier means is axially immovable relative to said cylinder.

3. An arrangement as defined in claim 1 for recording information wherein said light producing means constitute means for emitting a beam of such particular type along the cylinder axis toward said mirror means, said arrangement further comprising focussing means stationary relative to said cylinder and disposed in the path of said beam between said light producing means and said mirror means for concentrating said beam on the tape.

4. An arrangement as defined in claim 3 wherein said light producing means further comprise means for emitting a second beam, of a type which does not influence the permeability of the material of said tape, along the same path as said beam of such particular type, said arrangement further comprising means for receiving said second beam after it passes through said tape for comparing its variations with the variations imparted to said beam of such particular type.

5. A system for reproducing data previously stored in the form of radiation permeability variations on a tape of a material whose permeability is modified by an impinging beam of a particular type, comprising in combination:

a hollow cylinder having an inner wall arranged for receiving one such tape for movement along a predetermined helical path against said inner wall;

means associated with said cylinder for guiding such tape along such helical path;

mirror means disposed along the axis of such cylinder and oriented for reflecting light travelling along said axis by 90° to be normal to the axis of said cylinder;

mirror carrier means axially immovable relative to said cylinder and supporting said mirror for rotation about the cylinder axis; and light producing means positioned relative to said cylinder for producing a light beam which follows a path having two linear portions one of which extends normal to the tape surface and through the tape guide path and the other of which extends along the cylinder axis, the two portions meeting at said mirror means where the beam is reflected, wherein the light beam produced by said light-producing means is of a type which does not influence the tape material permeability and which first travels over the one portion of the beam path from outside the cylinder toward said mirror means, and said cylinder is provided with a section which is permeable to the light of such beam in the region where the beam path traverses said cylinder, said arrangement further comprising reading means responsive to the light of said beam and disposed for receiving light reflected by said mirror means along said other portion of said path.

6. An arrangement as defined in claim 5 wherein said light-producing means comprises circular light directing means disposed around said cylinder in line with the region where the light beam path traverses said cylinder for directing such light beam onto said one portion of its path along any radius of the cylinder.

7. An arrangement as defined in claim 5 wherein said light producing means further comprise a mirror arrangement for causing said one portion of said beam path to rotate about the axis of said cylinder in synchronism with the rotation of said mirror carrier means, the said mirror arrangement being disposed outside of said cylinder.

8. An arrangement as defined in claim 5 wherein said section of said cylinder which is permeable to light extends substantially around the entire periphery of said cylinder, and further comprising an annular concentrating lens disposed around, and stationary relative to, said cylinder and in alignment with said section.

9. An arrangement as defined in claim 5 wherein said reading means comprise an array of photodiodes.

10. An arrangement as defined in claim 9 wherein information is recorded on said tape in the form of a plurality of parallel tracks, said reading means are arranged for producing an image of a portion of at least two adjacent tracks, and the distance between said photodiodes is less than the spacing between the images of two adjacent tracks.

11. An arrangement as defined in claim 10 wherein said light-producing means are arranged for producing a beam whose diameter at the point where it traverses said tape is greater than the distance between two adjacent tracks on said tape.

12. An arrangement as defined in claim 5 wherein said reading means are arranged for producing an image of the portion of said tape traversed by said beam, and further comprising means disposed in said other portion of said beam path for compensating for rotation of the image about the axis of said cylinder due to the rotation of said mirror carrier means.

13. An arrangement as defined in claim 12 wherein said compensating means is mounted for rotation about the axis of said cylinder at a rate which is one-half the rate of rotation of said mirror carrier means.

14. An arrangement as defined in claim 13 wherein said reading means forms a real image of the portion of said tape traversed by said light beam and the sense of rotation of said compensating means is opposite that of said mirror carrier means.

15. An arrangement as defined in claim 14 wherein said compensating means are constituted by a biprism.

16. An arrangement as defined in claim 14 wherein said compensating means are constituted by a plurality of planar mirrors.

* * * * *